(12) United States Patent
Meltzer et al.

(10) Patent No.: US 9,864,755 B2
(45) Date of Patent: Jan. 9, 2018

(54) SYSTEMS FOR ASSOCIATING AN ONLINE FILE FOLDER WITH A UNIFORM RESOURCE LOCATOR

(71) Applicant: Go Daddy Operating Company, LLC, Scottsdale, AZ (US)

(72) Inventors: Jason Meltzer, Chandler, AZ (US); Jason Robinson, Gilbert, AZ (US); Jason Haslup, Phoenix, AZ (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 830 days.

(21) Appl. No.: 13/791,800

(22) Filed: Mar. 8, 2013

(65) Prior Publication Data

US 2014/0258349 A1  Sep. 11, 2014

(51) Int. Cl.
*G06F 17/30* (2006.01)

(52) U.S. Cl.
CPC .... *G06F 17/30194* (2013.01); *G06F 17/3089* (2013.01); *G06F 17/30115* (2013.01); *G06F 17/30126* (2013.01); *G06F 17/30289* (2013.01); *G06F 17/30705* (2013.01)

(58) Field of Classification Search
CPC .. G06F 21/60; G06F 2221/2117; G06F 17/30; G06F 17/30699; G06F 17/30887; G06F 17/30705; G06F 17/3089; G06F 17/30952; G06F 17/30876; G06F 17/30115
USPC .......................... 707/600–899; 709/200–256
See application file for complete search history.

(56) References Cited

U.S. PATENT DOCUMENTS

| | | |
|---|---|---|
| 5,404,294 A | 4/1995 | Karnik |
| 5,771,354 A | 6/1998 | Crawford |
| 5,983,214 A | 11/1999 | Lang et al. |
| 6,003,030 A | 12/1999 | Kenner et al. |
| 6,334,132 B1 | 12/2001 | Weeks |
| 6,418,441 B1 | 7/2002 | Call |
| 6,675,299 B2 | 1/2004 | Porter et al. |
| 6,880,007 B1 * | 4/2005 | Gardos ............. H04L 29/12594 709/224 |
| 6,982,802 B2 | 1/2006 | Borg et al. |
| 7,181,438 B1 | 2/2007 | Szabo |
| 7,194,552 B1 * | 3/2007 | Schneider ...................... 709/245 |

(Continued)

OTHER PUBLICATIONS

Microsoft Tech Net—Exchange Server 2003—SMTP Service Storage Drivers, 2007.

(Continued)

*Primary Examiner* — Michelle Owyang
(74) *Attorney, Agent, or Firm* — Quarles & Brady LLP

(57) ABSTRACT

Systems and method of the present invention provide for one or more server computers configured to register a domain name; receive a request to: generate a file folder linked to an online storage account owned by a user; and map a URL, comprising a sub domain concatenated to the registered domain name, to the file folder. The server(s) may be further configured to determine whether an alias for the URL, comprising the subdomain, is located in a DNS record for the domain name. The server(s) may automatically generate the file folder and map the URL to the file folder. Any HTTP requests comprising the URL received by the server(s) may be resolved to the file folder.

18 Claims, 12 Drawing Sheets

(56) References Cited

U.S. PATENT DOCUMENTS

| | | | |
|---|---|---|---|
| 7,349,892 B1* | 3/2008 | Virdy | G06F 17/30616 |
| 7,403,953 B2 | 7/2008 | Lockhart | |
| 7,483,929 B2 | 1/2009 | Kulkarni et al. | |
| 7,506,010 B2 | 3/2009 | Kulkarni et al. | |
| 7,734,593 B2 | 6/2010 | Prahlad et al. | |
| 7,805,379 B1 | 9/2010 | Adkins, III et al. | |
| 7,647,387 B2 | 10/2010 | Bellare et al. | |
| 7,831,682 B2 | 11/2010 | Certain et al. | |
| 7,987,262 B2 | 7/2011 | Tung et al. | |
| 8,166,108 B1* | 4/2012 | Peters et al. | 709/203 |
| 8,195,652 B1* | 6/2012 | Parsons | G06F 17/3089 705/14.4 |
| 8,473,635 B1* | 6/2013 | Lohner | H04L 61/1511 709/218 |
| 8,938,526 B1* | 1/2015 | Richardson | H04L 67/1036 709/217 |
| 9,141,717 B2* | 9/2015 | Schneider | G06F 17/30887 |
| 2001/0037057 A1 | 11/2001 | Bardy | |
| 2002/0019827 A1 | 2/2002 | Shiman et al. | |
| 2002/0120639 A1 | 8/2002 | Basin et al. | |
| 2002/0147790 A1 | 10/2002 | Snow | |
| 2002/0161745 A1* | 10/2002 | Call | A61L 2/10 |
| 2003/0126136 A1 | 7/2003 | Omoigui | |
| 2003/0208624 A1 | 11/2003 | Grossman | |
| 2004/0006597 A1 | 1/2004 | Hughes | |
| 2004/0167858 A1 | 8/2004 | Erickson | |
| 2005/0102348 A1 | 5/2005 | Parsons et al. | |
| 2005/0234921 A1* | 10/2005 | King | G06F 17/3089 |
| 2005/0283503 A1 | 12/2005 | Hancock | |
| 2006/0011720 A1 | 1/2006 | Call | |
| 2006/0031315 A1 | 2/2006 | Fenton et al. | |
| 2006/0047725 A1 | 3/2006 | Bramson | |
| 2006/0149715 A1 | 7/2006 | Glasser | |
| 2006/0179083 A1 | 8/2006 | Kulkarni et al. | |
| 2006/0200527 A1 | 9/2006 | Woods | |
| 2006/0206547 A1 | 9/2006 | Kulkarni et al. | |
| 2007/0061487 A1 | 3/2007 | Moore et al. | |
| 2007/0174237 A1 | 7/2007 | Wilbrink et al. | |
| 2007/0180060 A1 | 8/2007 | Patel et al. | |
| 2007/0225962 A1 | 9/2007 | Brunet et al. | |
| 2008/0033866 A1 | 2/2008 | Boswell et al. | |
| 2008/0115071 A1 | 5/2008 | Fair | |
| 2008/0133624 A1 | 6/2008 | Phillips et al. | |
| 2008/0235289 A1 | 9/2008 | Carnes et al. | |
| 2009/0254572 A1 | 10/2009 | Redlich et al. | |
| 2009/0272799 A1 | 11/2009 | Skor et al. | |
| 2010/0030791 A1 | 2/2010 | Iverson et al. | |
| 2010/0036931 A1 | 2/2010 | Certain et al. | |
| 2010/0106691 A1 | 4/2010 | Preslan et al. | |
| 2010/0114739 A1 | 5/2010 | Johnston | |
| 2010/0121879 A1 | 5/2010 | Greenberg | |
| 2010/0125473 A1 | 5/2010 | Tung et al. | |
| 2010/0153848 A1 | 6/2010 | Saha | |
| 2010/0191783 A1 | 7/2010 | Mason et al. | |
| 2010/0306267 A1 | 12/2010 | Zamoff et al. | |
| 2010/0332456 A1 | 12/2010 | Prahlad et al. | |
| 2010/0332818 A1 | 12/2010 | Prahlad | |
| 2010/0333116 A1 | 12/2010 | Prahlad et al. | |
| 2011/0040980 A1 | 2/2011 | Kerr et al. | |
| 2011/0087690 A1 | 4/2011 | Cairns | |
| 2011/0106802 A1 | 5/2011 | Pinkney et al. | |
| 2011/0137865 A1 | 6/2011 | Shin et al. | |
| 2011/0161291 A1 | 6/2011 | Taleck et al. | |
| 2011/0173149 A1 | 7/2011 | Schon | |
| 2011/0225206 A1* | 9/2011 | Sureshchandra et al. | 707/802 |
| 2011/0252071 A1* | 10/2011 | Cidon | G06F 17/30174 707/802 |
| 2012/0239731 A1* | 9/2012 | Shyamsunder et al. | 709/203 |
| 2013/0067115 A1* | 3/2013 | Lapanc | H04L 67/025 709/245 |
| 2014/0032477 A1* | 1/2014 | Trammel et al. | 707/600 |
| 2014/0143331 A1* | 5/2014 | Smith | G06F 17/2795 709/204 |

OTHER PUBLICATIONS

Alternatives to Domain Names. Downloaded from http://cyber.law.harvard.edu/property00/domain/alternatives.html on Mar. 23, 2006.

World Wide Scrabble front page. Downloaded from http://www.scrabble.com/ on Mar. 23, 2006.

Padamanabban, Venkata, et al. Determining the Geographic Location of Internet Hosts [Online]. Jun. 2001 [Retrieved on Oct. 2, 2008] ACM. ACM Sigmetrics Performance Evaluation Review.

Brain, Marshall. How Domain Name Servers Work [Online]. Retrieved from: http://web.archive.org/web/20020223193850/www.howstuffworks.com/dns.htm/printable. Feb. 23, 2002.

Huang et al.; Design of Privacy-Preserving Cloud Storage Framework; Grid and Cooperative Computing (GCC), 2010 9th International; Nov. 1-5, 2010; pp. 128-132.

* cited by examiner

SYSTEMS FOR ASSOCIATING AN ONLINE FILE FOLDER WITH A UNIFORM RESOURCE LOCATOR

This patent application is related to U.S. patent application Ser. No. 13/791,782 entitled: "ASSOCIATING AN ONLINE FILE FOLDER WITH A UNIFORM RESOURCE LOCATOR" concurrently filed herewith and also assigned to Go Daddy Operating Company, LLC.

FIELD OF THE INVENTION

The present inventions generally relate to domain names and online file storage and, more particularly, systems and methods for mapping/routing a uniform resource locator (URL) to a folder within the online file storage, the URL comprising sub domain concatenated to a domain name.

SUMMARY OF THE INVENTION

An example embodiment of a method of associating an online file folder with a uniform resource locator (URL) may comprise the steps of one or more server computers registering a domain name and receiving a request to generate a file folder linked to an online storage account owned by a user and map a URL, comprising a sub domain concatenated to the registered domain name, to the file folder. The server(s) may then determine whether an alias for the URL, comprising the subdomain, is located in a domain name system (DNS) record for the domain name. The server(s) may automatically generate the file folder and map the URL to the file folder. Any hypertext transfer protocol (HTTP) requests comprising the URL received by the server(s) may be resolved to the file folder.

An example embodiment of a system for associating an online file folder with a URL via a user account may comprise one or more server computers communicatively coupled to a network and configured to: register a domain name; receive a request to: generate a file folder linked to an online storage account owned by a user; and map a URL, comprising a sub domain concatenated to the registered domain name, to the file folder. The server(s) may be further configured to determine whether an alias for the URL, comprising the subdomain, is located in a DNS record for the domain name. The server(s) may automatically generate the file folder and map the URL to the file folder. Any HTTP requests comprising the URL received by the server(s) may be resolved to the file folder.

The above features and advantages of the present inventions will be better understood from the following detailed description taken in conjunction with the accompanying drawings.

DETAILED DESCRIPTION

Figure 1:
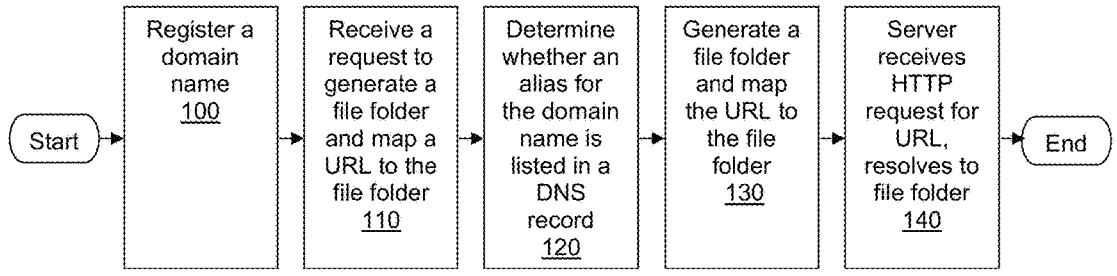
FIG. 1 is a flow diagram illustrating a possible embodiment of a method for associating an online file folder with a URL.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between people or organizations that make use of network or computer resources (users). Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as websites. Websites comprise a collection of connected or otherwise related, web pages. The combination of all the websites and their corresponding web pages on the Internet is generally known as the World Wide Web (WWW) or simply the Web.

The DNS is the world's largest distributed computing system that enables access to any resource in the Internet by translating user-friendly domain names to IP Addresses. The process of translating domain names to IP Addresses is called Name Resolution. A DNS name resolution is the first step in the majority of Internet transactions. The DNS is in fact a client-server system that provides this name resolution service through a family of servers called Domain Name Servers. The hierarchical domain space is divided into administrative units called zones. In other words, a DNS zone is a subset (e.g., a single domain) of the domain name structure of the DNS which uses a text file to describe the DNS zone. A zone usually consists of a domain (e.g. example.com) and possibly one or more sub domains (e.g. projects.example.com, services.example.com). The authoritative data needed for performing the name resolution service is contained in a file called the zone file and the DNS servers hosting this file are called the authoritative name servers for that zone.

The zone file may be stored as text file on DNS server or the information from the zone file may be categorized and stored in a database on the DNS server which may be a database server. Some DNS servers may use the zone files only as a starting point to compile the information into database format and store the information in a database. As a non-limiting example, a zone file may be accessed using zone information "example.com" {type master; file "/var/named/db.example.com";};

The DNS, and the zone file specifically, may contain mappings between domain names and their IP addresses, and may further map domain names/IP addresses to other resources. The zone file may comprise one or more "A records" (for IPv4) or "AAAA records" (for IPv6) used to chart the mappings between the domain names, their IP addresses and/or other resources. For example:

| | |
|---|---|
| $ORIGIN example.com. | ; start of this zone file in the namespace |
| example.com. IN | ; example.com used on Internet |
| example.com NS ns | ; ns.example.com is a name server for example.com |
| example.com A 192.0.2.1 | ; IPv4 address for example.com |
| example.com AAAA 2001:db8:10::1 | ; IPv4 address for example.com |
| www. CNAME example.com | ; www.example.com is an alias for example.com |
| CDN 01 example.com. | ; example.com is marked as subscribed to CDN01. |

As seen above, the zone file may be organized in the form of text representations in sequence known as resource records, which may occur in any order within the zone file. Each line of the zone file may comprise a text description that defines a single resource record. The description of the resource record consists of several fields separated by white space (spaces or tabs). Each record may have a record type, which provides the name for each record.

As a general rule, the first field is the domain name (the "owner" of the record, or previous record, if blank). A time to live field may also be included, as well as a record class, which indicates the namespace of the record's information, a record type, and/or one or possibly several fields of type-specific data.

A Canonical Name record (CNAME) may comprise a type of resource record in the DNS that specifies that the domain name is an alias of another, canonical domain name. The CNAME may be helpful when running multiple services (like an FTP server and a webserver; each running on different ports) from a single IP address because each service can then have its own entry in the DNS (like ftp.example.com and www.example.com). CNAMEs may be handled specially in the DNS: when a DNS resolver encounters a CNAME record while looking for a regular resource record, the DNS resolver may restart the query using the CNAME instead of the original name. The canonical name that a CNAME record points to can be anywhere in the DNS, whether local or on a remote server in a different DNS zone.

The DNS infrastructure consists of many different types of DNS servers, DNS clients, and transactions between these entities. The most important transaction in DNS is the one that provides the core service of DNS (i.e., name resolution service) and is called the DNS Query/Response. A DNS Query/Response transaction is made up of a query originating from a DNS client (generically called a DNS resolver) and response from a DNS name server. In this way, the DNS serves as a global, distributed database. Name servers (serving zone files) each contain a small portion of the global domain space, and clients issue queries using a domain name.

Some Web sites have started providing document storage managers that allow users to store and access files from a Web site storage area. The document storage managers provide functions for finding, managing and organizing the user's files in the web site storage area. The document storage manager thus gives the users much greater control over the management of their files. Using these functions, a user from a first client may transmit a file from the first client to be stored into a web site storage area, then move to a second client and transmit the file from the web site storage area to the second client. This process allows the user to sequentially work on the most up to date version of the same file from a plurality of different clients by simply repeating the process of transmitting the file to the client, editing the file, and then transmitting the file back to the web site storage area.

Applicant has determined, however, that presently-existing document storage managers do not identify the source of one or more folders within the document storage manager software. This creates a potential security concern for users who may want to download the files. The user has no way to either organize the files/documents in a central location, or to associate the document storage manager with any online identifiers of the user.

Applicant has therefore determined that optimal systems and methods may improve on presently-existing document storage systems by associating the file folders within the document storage manager software with a user administrating the document storage manager software. Optimally, the one or more folders within the document storage software would be associated with a domain name registered to the user. As described herein, a domain name may be associated with a file folder within the document storage system via a "vanity URL" made up of a customized sub domain concatenated to the domain name. Such systems and methods may overcome the security concerns introduced by presently-existing systems.

Methods and Systems for Mapping a URL to an Online Folder

Several different methods may be used to provide and manage the disclosed inventions. In an example embodiment illustrated in FIG. 1, any combination of software modules running on one or more server computers, as described below, may register a domain name via a domain name account (Step 100) and receive a request (Step 110) to generate a file folder configured to: store at least one file; and map a URL to the file folder. The URL may be made up of a sub domain concatenated to the domain name.

The method shown in FIG. 1 may further comprise the steps of determining whether an alias for the domain name is listed within a DNS record for the domain name (Step 120). The alias may comprise the sub domain. If the alias is listed within the DNS record, the server(s) may automatically generate the file folder and map the URL to the file folder (Step 130). The server(s) may then receive an HTTP request comprising the URL and resolve the HTTP request to the file folder (Step 140).

Figure 2:
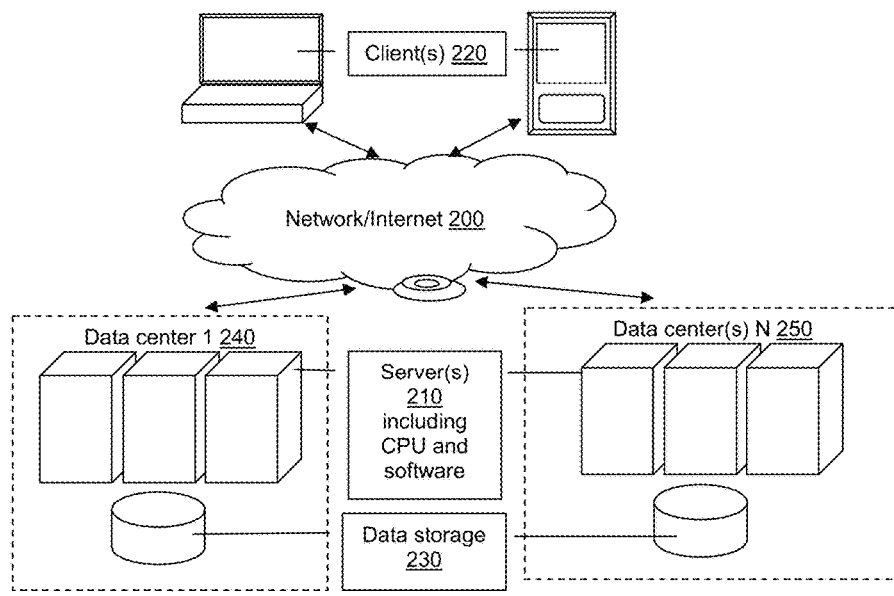
FIG. 2 illustrates a possible embodiment of a system for associating an online file folder with a URL via a user account.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220, and executing instructions stored (perhaps as scripts and/or software, possibly as software modules) in computer-readable media accessible to the CPU, such as a hard disk drive on a server 210 and/or client 220.

The example embodiments herein place no limitations on whom or what may comprise users. Thus, as non-limiting examples, users may comprise any individual, entity, business, corporation, partnership, organization, governmental entity, and/or educational institution.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with software modules and the data storage 230 disclosed herein) may be communicatively coupled to the network 200 and to each other in such a way as to allow the exchange of information required to accomplish the method steps disclosed herein, including, but not limited to receiving the information from a user interface on one or more clients 220, and one or more servers 210 receiving the information as transmitted by the client(s) 220.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, "smart" phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

The client computer(s) 220 which may be operated by one or more users and may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, a "smart" phone, an Internet access device, a rich client, thin client, or any other client functional with a client/server computing architecture. Client software may be used for authenticated remote access to one more hosting computers or servers, described below. These may be, but are not limited to being accessed by a remote desktop program and/or a web browser, as are known in the art.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in and after FIG. 4, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc.

The software modules used in the context of the current invention may be stored in the memory of—and run on—at least one server 210 and/or client 220. The software modules may comprise software and/or scripts containing instructions that, when executed by a microprocessor on a server 210 and/or client 220, cause the microprocessor to accomplish the purpose of the module or the methods disclosed herein.

Figure 3:
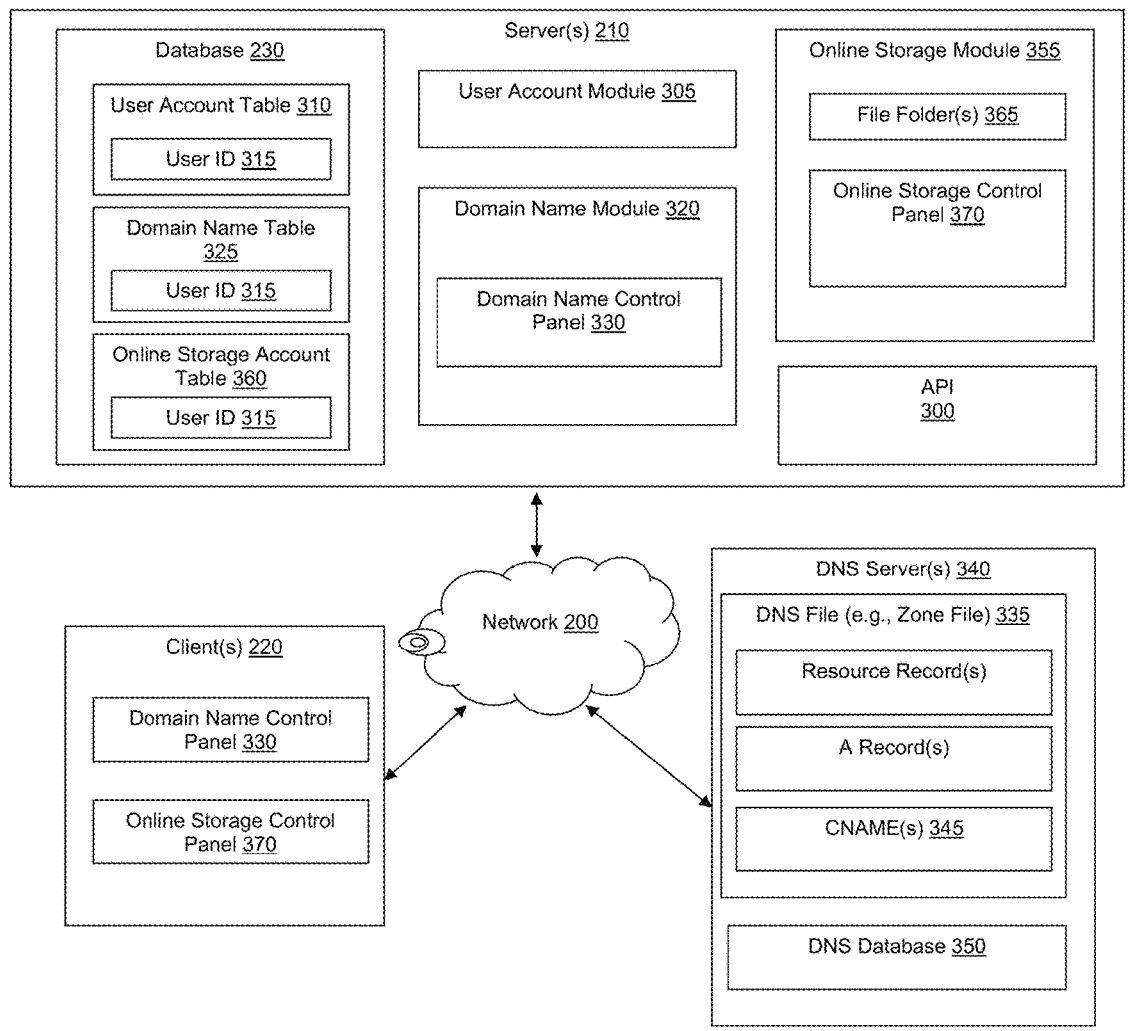
FIG. 3 illustrates a more detailed possible embodiment of a system for associating an online file folder with a URL.

The environment(s) in FIGS. 2-3 may include one or more centralized software modules capable of connecting to any type of software within the environment In some embodiments, this centralized software may comprise an Application Programming Interface (API) 300 and any request to the API 300 disclosed herein may comprise a Remote Procedure Call (RPC) to the API 300. An API 300 may comprise a service made available to third parties, which may further comprise any individual, entity, system, hardware, or software wishing to access the disclosed information and functionality. Such an API 300 may comprise a software-to-software interface that specifies the protocol defining how independent computer programs interact or communicate with each other. It also may comprise a collection of pre-configured building blocks allowing a third party to easily configure their software for compatibility and/or extensibility. The API 300 may allow a requesting party's software to communicate and interact with the software application and/or its provider—perhaps over a network—through a series of function calls (requests for services). It may comprise an interface provided by the software application and/or its provider to support function calls made of the software application by other computer programs.

The API 300 may comprise any API type known in the art or developed in the future including, but not limited to, request-style, Berkeley Sockets, Transport Layer Interface (TLI), Representational State Transfer (REST), Simple Object Access Protocol (SOAP), RPCs, Standard Query Language (SQL), file transfer, message delivery, and/or any combination thereof. The API 300 may comprise computer-readable code that, when executed, causes the API 300 to receive an RPC (i.e., function call) requesting information services. Responsive to receipt of the RPC, the API 300 may perform the above described processes, and transmit a request results to the requesting third party.

To submit the request via an RPC to the API 300, the server(s) 210 may require authentication with the API 300. Computers or servers may locate the API 300 via an access protected URL mapped to the API 300, and may then use an API key configured to authenticate the one or more computers or servers prior to accessing the API 300.

The software modules may also include mobile applications, possibly on a client computer and/or mobile device. These mobile applications, or "apps" may comprise computer software designed to help people perform an activity and designed to help the user to perform singular or multiple related specific tasks. It may help to solve problems in the real world by manipulating text, numbers, graphics, or a combination of these elements.

The server(s) utilized within the disclosed system 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof).

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The server(s) 210 or software modules within the server(s) 210 may receive hypertext transfer protocol (HTTP) requests for files or other data stored on the server(s) 210 and may use server-side scripting languages such as ASP, PHP, CGI/Perl, proprietary scripting software/modules/components etc. to render the files requested and respond with the rendered files/pages to be displayed on the client(s) 220.

The server(s) 210 or software modules within the server(s) 210 may use query languages such as MSSQL or MySQL to retrieve the content from data storage 230. Server-side scripting languages such as ASP, PHP, CGI/Perl, proprietary scripting software/modules/components etc. may be used to process the retrieved data. The retrieved data may be analyzed in order to determine information recognized by the scripting language, information to be matched to those found in data storage, availability of requested information, comparisons to information displayed and input/selected from the user interface or any other content retrieval within the method steps disclosed herein.

The server 210 and/or client 220 may be communicatively coupled to data storage 230 to retrieve any information requested. The data storage 230 may be any computer components, devices, and/or recording media that may retain digital data used for computing for some interval of time. The storage may be capable of retaining stored content for any data requested, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

After registering a domain name with a domain name registrar, a registrant may develop a website and pay a hosting provider to host the website on the hosting provider's hosting servers, which are communicatively coupled to the Internet. As a non-limiting example, the domain name registrar and hosting provider may be a single service provider, such as GODADDY.COM. The website may comprise a plurality of files stored in a folder in a directory in the server's file system. The website also may provide functionality by accessing a database also running on the server.

Such files may be stored in any data storage medium capable of storing data or instructions for access and/or execution by a computing device, such as a server or client computer. Such data storage may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage, perhaps in a network storage device communicatively coupled to the network, such as a hard drive or other memory on a server.

Stored files may be organized in a server's file system, which may organize the files for the storage, organization, manipulation, and retrieval by the server's operating system.

The server's file system may comprise at least one directory, which in turn may comprise at least one folder in which files may be stored. In most operating systems, files may be stored in a root directory, sub-directories, folders, or sub-folders within the file system.

Most file systems have systems and methods of administering access permissions or access rights to specific users and/or groups of users. Such systems control the ability of users to view, edit, add to, delete, or otherwise make changes to files in the directories and/or folders of the file system. There are numerous different access permission types that may apply to directories, folders, or files. For example, the "read" permission may grant a user the ability to read a file. The "write" permission may grant the ability to modify a file. The "modify" permission may grant the ability to read, write to, and delete files. The "read and execute" permission may grant the ability to execute a file. The "full control" permission may enable a user to read, write to, change, and delete files and folders. Depending on the server's operating system and filesystem, other access permission conventions may be used (e.g., write, read, execute, update, delete, or drop), but they all generally control who may read, run, modify, or delete files stored on the server.

As seen in FIG. 2, the software modules, server(s) 210 and/or data storage 230 may exist and/or be hosted in one or more data centers 240, 250. These data centers 240, 250 may provide hosting services for websites, services or software relating to stored information, or any related hosted website including, but not limited to hosting one or more computers or servers in a data center 240, 250 as well as providing the general infrastructure necessary to offer hosting services to Internet users including hardware, software, Internet web sites, hosting servers, and electronic communication means necessary to connect multiple computers and/or servers to the Internet or any other network 200.

As users access and/or input information, this information may be redirected and distributed between and among the data centers 240, 250 via commands from any combination of software modules hosted on the server(s) 210 and executed via processors on the server(s) 210. This information may then be accessed and manipulated by the combination of software modules or stored in the data storage 230 of any of a plurality of data centers, either separate from or integrated into the one or more servers, so that the information is available to be searched and accessed by the user and/or any other components of any or all data centers.

Any references to "software combination," "combination of software," "combination of software modules" etc. referred to herein may include any combination of software modules executed by a microprocessor on either the server 210 or client 220 computers. These software modules may also be used in combination with any other method steps, hardware and/or software structures disclosed herein. The servers 210 may be hosted in any data center 240, 250 operated by any hosting provider such as those disclosed herein and the servers 210 and clients 220 may be operated by any users disclosed herein.

In the interest of simplicity, FIG. 3 shows a consolidated environment for accomplishing the methods disclosed herein, where the disclosed software modules 305, 320, 355, database 230 and the API 300 are all hosted on a single server computer 210 in a single data center 240, 250, and where a DNS server(s) 340 comprises the DNS file(s) 335, a DNS database 350 and/or a database server hosted on a DNS server (not shown).

Other embodiments, however, may utilize a highly distributed environment wherein the disclosed software modules 305, 320, 355, database 230 and the API 300 are each hosted on their own separate server 210 and communicatively coupled to one another via the network 200. Still other embodiments may include the DNS file(s) 335, the DNS database 350 and/or any database server, hosted on the single server 220. Thus, any combination of the disclosed software may be hosted on any combination of server(s) 210 and communicatively coupled to the network 200.

As seen in FIG. 3, the server(s) 220 may host one or more user account software modules 305. The user account module(s) 305 may be configured to access an administrative account for a user or a "user account," "customer account" or "shopper account" for a user of the services provided by a business entity. Non-limiting examples of entities that provide these services may include a domain name registry, a domain name registrar, a hosting provider, a secure sockets layer (SSL) or other online security Certification Authority (CA), a software development or e-commerce company, etc. Non-limiting examples of the services provided by such a service provider may include, as non-limiting examples, domain name registration and maintenance services, web hosting and maintenance services, website development and maintenance services, SSL certificate validation, signing and issuance services, installation of SSL certificates on hosted websites, DNS services (e.g., domain name/URL resolution, and/or hosting a DNS software, database server, relevant zone, or other DNS files 335 and/or a DNS database 350), email services, calendaring/scheduling services, online storage services, fax services, etc. Any combination of these services may be provided by a single service provider (e.g., GO DADDY'S MANAGE YOUR ACCOUNT administration software, as a non-limiting example).

The user account module(s) 305 may provide access to the service provider's services via the administrative user account, and may therefore be considered a "master account" for any of the services described herein. As non-limiting examples, the user account module(s) 305 may provide access to an administrative account and/or server-rendered control panel interface for each of the various services provided through the user account. These one or more control panel interfaces may be accessible via any client 220 and may comprise, as non-limiting examples, a web page, a client side program, an "app," a server administration interface, etc. In some embodiments, access to the services may be provided via one or more administration and/or control panel interfaces, possibly rendered by the server(s) 210 and transmitted to clients 220 as webpages accessible via the Internet.

As non-limiting examples, a user may access, either independently or via the user account module(s) 305 (possibly a control panel for the user account module 305) one or more control panels for a domain name module 320 for registering and administrating domain names or an online storage module 355 for creating and administrating one or more online storage accounts and/or folders as described herein. Additional control panels accessible via the user account module(s) 305 may include control panels for: creating and administrating hosting services; receiving, installing or otherwise administrating SSL or other online security certificates; creating and administrating one or more hosted websites; creating and administrating DNS settings; creating and/or administrating email, calendaring, fax services; etc.

To create a user account, the user account module(s) 305 may be configured to render and transmit, for display on the client(s) 220, a user account signup interface, possibly a web page or other client side user interface. The signup interface may be configured to receive, from the user, a request to create a user account and a username and password for the user account. The signup interface may be further configured to receive additional information from and about the user, including contact information such as a phone number, SMS messaging contact information, email address, etc.

The signup interface may then be configured to transmit the user's information to the server(s) 210. The server(s) 210 may receive this information, and store the information in a database 230. In some embodiments, the information may be stored as a user account record in a user account table 310 of the database 230. Each record stored in the user account table 310 may be assigned a unique user account identification (user ID) 315. In some embodiments, this user ID 315 may be a unique number auto-generated and assigned, by the database, to the record created for the user account in the database 230, each record being auto-incremented from the last. In other embodiments, the user account module(s) 305 may assign each new user account a user ID 315. The user ID 315 may be may be included (possibly as a foreign key) within all records stored in the database 230 that are associated with this "master" user account. As non-limiting examples, as shown in FIG. 3, the user ID 315 may be stored in domain name records within a domain name table 325 and/or may be stored in online storage account records within an online storage account table 360, both described herein.

In some embodiments, the domain name module(s) 320 and the online storage module(s) 355 may be software modules/methods within the user account module 305. In other embodiments, these software modules may run independently from the user account module(s) 305. In embodiments where these modules run independently, all software modules may be communicatively coupled to, accessible to (possibly via API 300) and associated with the user account module 305. This may be accomplished via the user ID 315 for individual user accounts. In other words, the system may analyze the user ID 315 stored within the database 230 to determine whether a given user has the necessary prerequisites to subscribe to or otherwise use one of the services offered by the service provider.

As a non-limiting example, and as described herein, the domain name module 320 may be configured to store a domain name record in the domain name table 325 for each domain name registered via the domain name module(s) 320. As seen in FIG. 3, each of these domain name records may be joined to a user account record for the user/registrant that registered the domain name via the user ID 315. In some embodiments, this join may be the user ID 315 stored as a foreign key in each of the domain name records. Likewise, in this non-limiting example, and as seen in FIG. 3, the online storage module(s) 355 may be configured to store an online storage account record for a user that has subscribed to the online storage service. The online storage account record for each user that subscribes may also be joined to the user account record for the subscribing user via the user ID 315 of the user. In some embodiments, this join may be a user ID 315 stored as a foreign key in each of the online storage account records.

In this non-limiting example, and as described herein, if a user wanted to associate a file folder 365 within the online storage module(s) 355 with a domain name registered by the user, the system may receive a request from a user of the online storage module(s) 355 to associate the file folder 365 with a domain name. The online storage module 355 may be configured to determine whether the user ID 315 associated in the database 230 with the online storage account is also associated with at least one domain name record in the database 230, as having registered at least one domain name would be a prerequisite to associate a file folder 365 within the online storage module 355 with a domain name registered by the user.

Likewise, in this non-limiting example, the system may receive a similar request from the domain name module 320 to associate a domain name with a file folder 365 in the online storage module 355. The domain name module 320 may be configured to determine whether the user ID 315 associated in the database 230 with the a domain name account or any of the domain names registered to the user are also associated with an online storage account record in the database 230, as having an online storage software account would be a prerequisite to associate a file folder 365 within the online storage module 355 with a domain name registered by the user.

For efficiency, the user account may utilize Single Sign On (SSO) technologies to access all associated products (e.g., domain name control panel 330, online storage control panel 370, etc., described herein). These SSO technologies may comprise any technology used to access control of multiple related, but independent software systems or accounts. Thus, the user may log in once to the user account and may then gain access to all related systems or accounts without being prompted to log in again at each of them. This is accomplished by centralizing authentication to all applications to one or more centralized authentication servers that all other applications and systems utilize for authentication purposes, and combines this with techniques to ensure that users do not need to actively enter their credentials more than once.

As seen in FIG. 3, the system may comprise one or more domain name software modules 320 running on server(s) 210. As previously described, the domain name module(s) 320 may comprise a domain name control panel 330, further comprising a website or another client-side interface configured to receive information from a user. In some embodiments, this domain name control panel 330 may comprise, or comprise a link or redirect to, a front of site or other control panel 330 for a domain name registry or domain name registrar (e.g., GODADDY.COM). In these embodiments, once the domain name is registered, the user may be redirected to the domain name control panel 330 for the domain name modules 320.

The domain name control panel 330 for the domain name module(s) 320 may be configured to receive one or more requested domain names from a user. The domain name control panel 330 may then transmit the requested domain names to the server(s) 210 and the domain name module(s) 320 may be configured to search the requested domain name to determine if the domain name is available. If not, the domain name module(s) 320 may be configured to "spin" the requested domain name(s) or in other words, calculate and identify alternate domain names to be suggested to the user. If the requested domain names are available and selected by the user, or the "spun" domain name(s) are selected by the user, the domain name module(s) 320 may be configured to register the domain name(s) selected by the user, and administrate the registered domain names.

For each domain name registered via the domain name module(s) 320, the domain name module(s) 320 may be configured to identify the associated user ID 315, and generate and insert a new record into the domain name table 325 of the database 230. This record may comprise the user ID 315 and, as non-limiting examples, the registered domain name and the registration date.

During the domain name registration process, A DNS record may be created for the registered domain name. In some embodiments, the domain name module(s) 320 may be configured to access the DNS file 335 and insert the DNS record information for the domain name into the DNS file 335. The information for the domain name may include record type, standard resource records, customized resource records and/or alias/CNAME 345 information as described herein. In some embodiments, the domain name module(s) 320 may create, access and update the DNS file 335 via an RPC to the API 300. In some embodiments, when the domain name is registered, the DNS record may be automatically created and/or updated with additional information.

The DNS record information for the registered domain name inserted into the DNS file 335 may include customized resource records and/or an alias to be stored as a resource record CNAME 345 field. This customized information may also be updated during the domain name registration process, and may include, as the CNAME/alias value, a sub domain for the registered domain name. In some embodiments, this sub domain alias stored in the CNAME 345 field of the customized resource record may be created automatically as part of the domain name registration process.

As a non-limiting example, the domain name module(s) 320 and/or the API 300 may be configured to insert/update an alias for the sub domain "files." into the CNAME 345 field in the customized resource record. This alias/CNAME 345 may be created in anticipation of an associated folder to be created in the online storage module 355. Thus, each domain name registered may be automatically associated and configured with a CNAME 345 record for a "files" subdomain.

In some embodiments, the sub domain may be customizable. As a non-limiting example, an avid biker may want to access bike pictures stored in a file folder 365 accessible via the URL "bikepictures.mydomain.com." The server-rendered interface for the domain name module(s) 320 may be configured to receive, from the user, one or more sub domains to be inserted as a CNAME 345 alias in the customized resource record, and associated with the file folder 365 to be created within the online storage module(s) 355. The user interface for the domain name module(s) 320 may be further configured to transmit the received sub domain(s) to the appropriate software, which may be configured to insert the alias as a CNAME 345 field into the DNS file 335.

Figure 4:
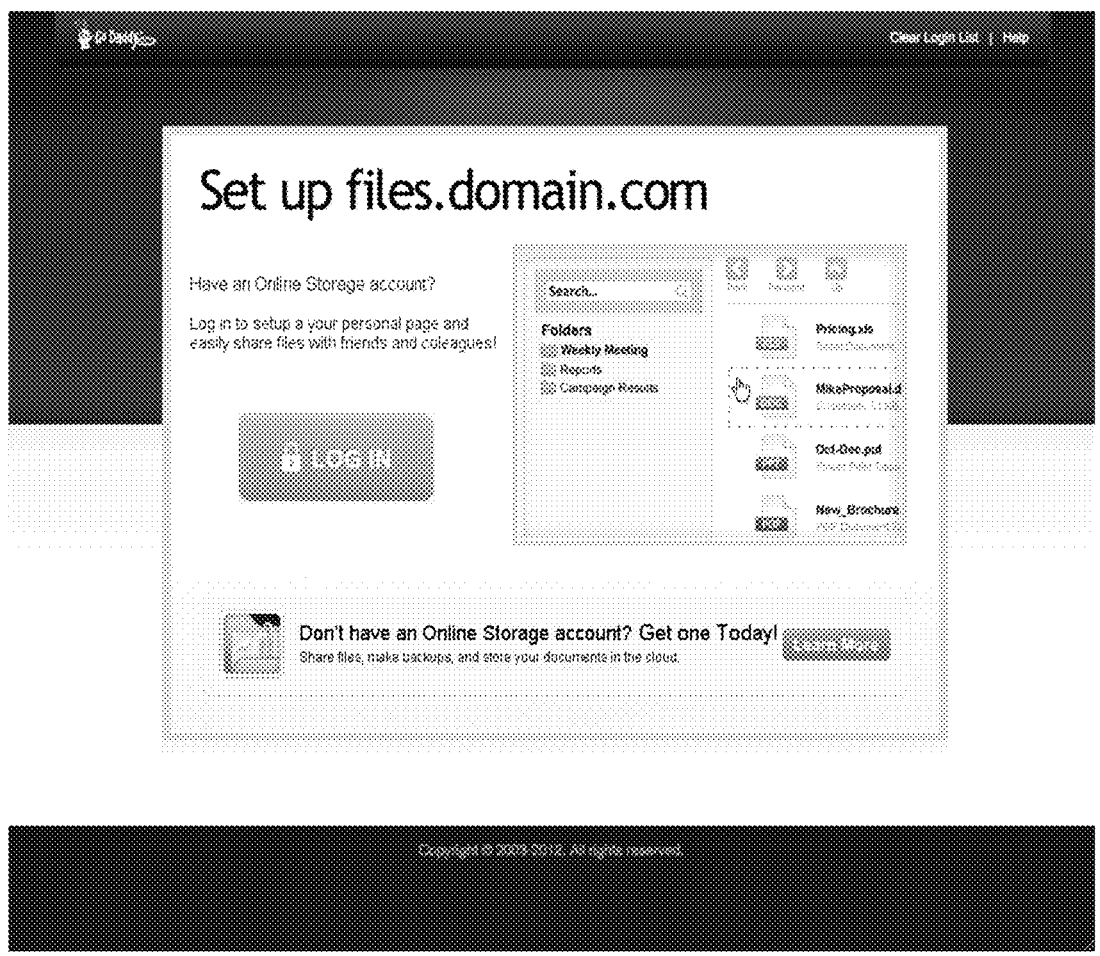
FIG. 4 is an example interface illustrating a possible embodiment of a system and method of associating an online file folder with a URL.
Figure 5:
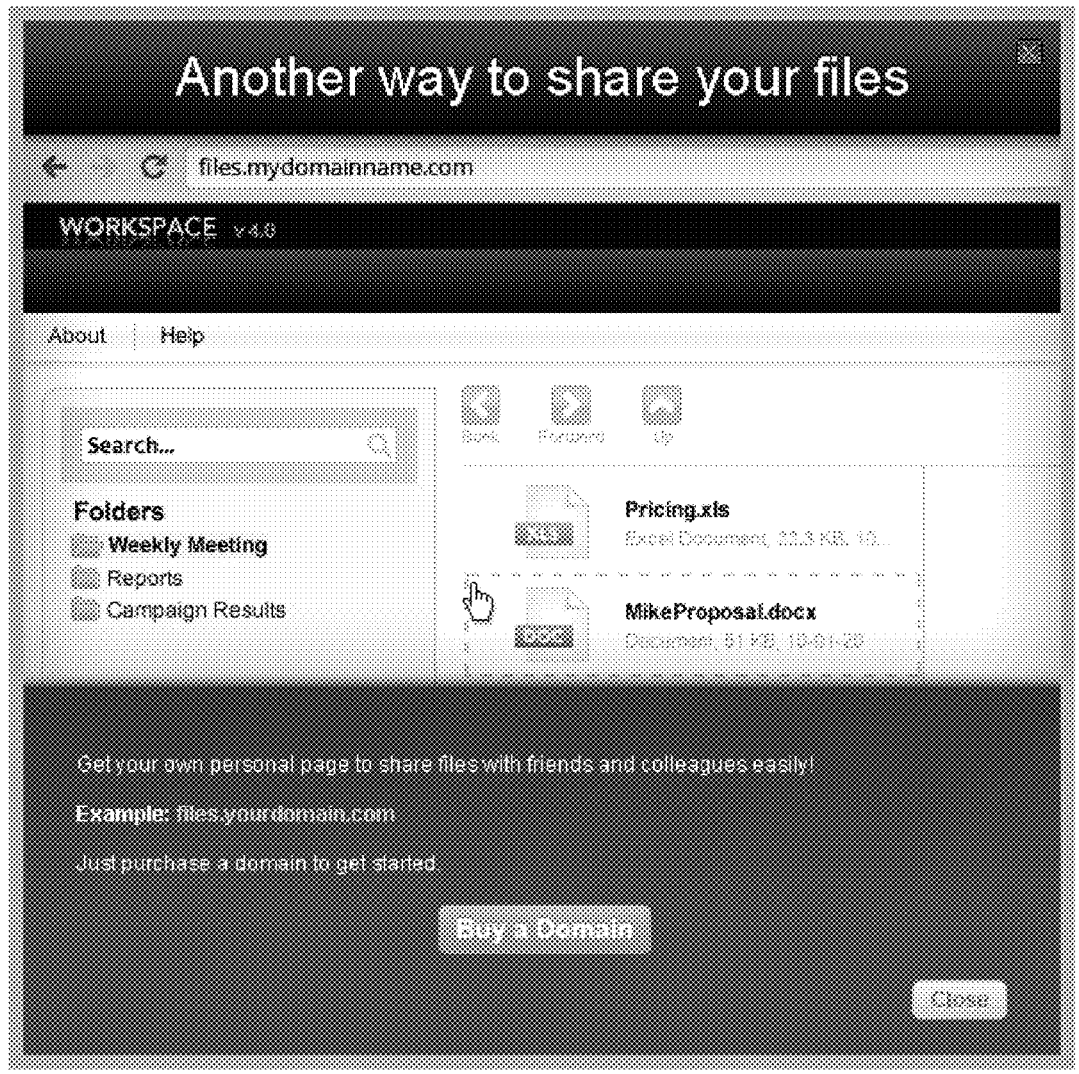
FIG. 5 is an example interface illustrating a possible embodiment of a system and method of associating an online file folder with a URL.
Figure 6:
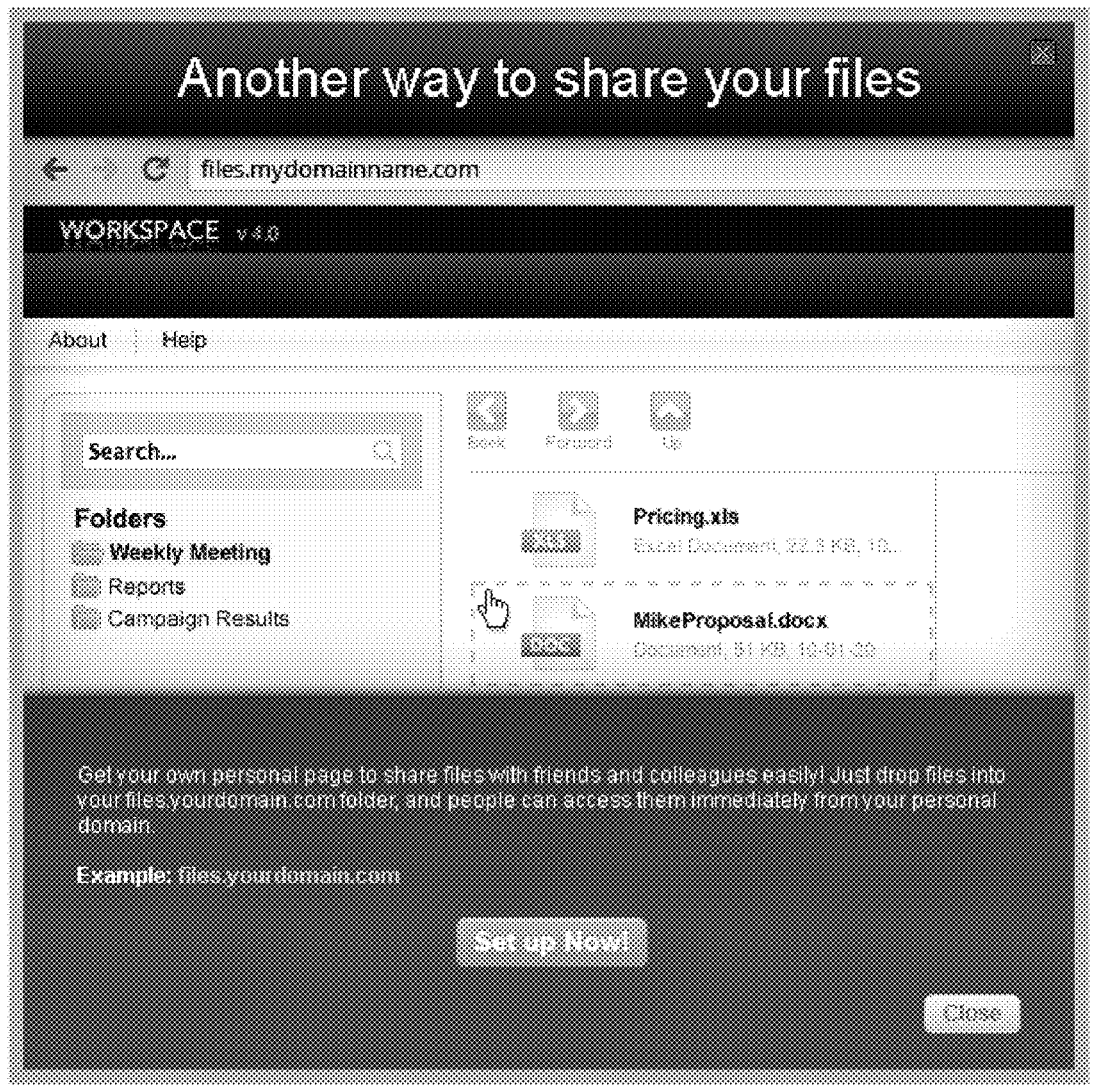
FIG. 6 is an example interface illustrating a possible embodiment of a system and method of associating an online file folder with a URL.

As seen in FIGS. 4-6, the user account module 305 may be configured to transmit an advertisement of a service for associating the one or more registered domain names with a file folder 365 stored within the online storage module(s) 355. An "advertisement pop in window" may be shown to the user, any time after logging in to user account or any related software or control panel via a user account control panel. This advertisement may explain features of the service to associate the one or more registered domain names with a file folder 365 stored within the online storage module(s) 355.

Figure 7:
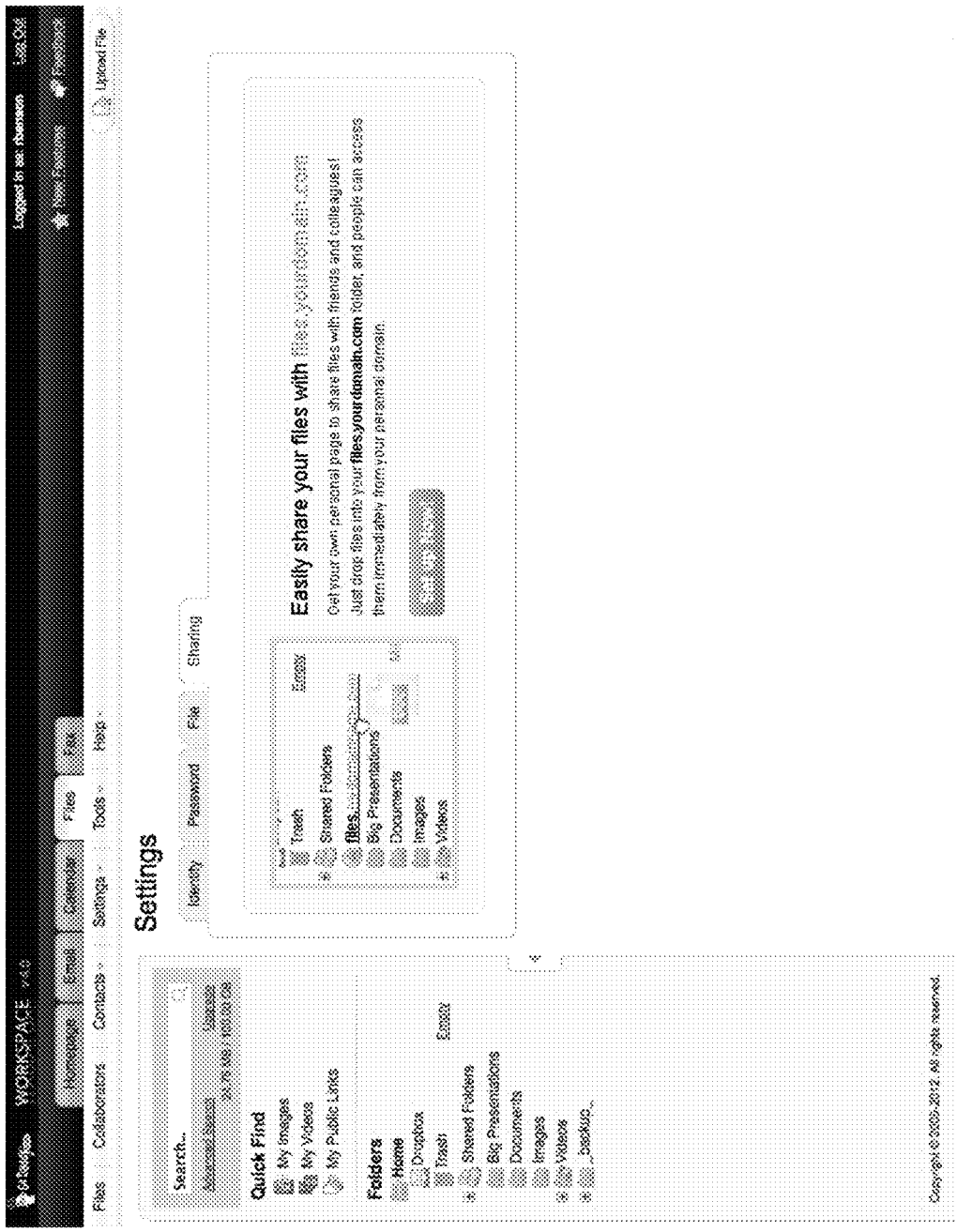
FIG. 7 is an example interface illustrating a possible embodiment of a system and method of associating an online file folder with a URL.

After the user has logged in to their user account using the user ID 315, or has logged into any software associated with the user ID 315, the user account module(s) 305, or other software module(s) such as the online storage module(s) 355 (as seen in FIG. 7), may be configured to determine whether: (1) one or more online storage account records in the online storage account table 360 of the database 230 contain the user ID 315 for the currently logged in user account; and (2) one or more domain name records in the domain name table 325 of the database 230 contain the user ID 315 for the currently logged in user account.

If the user account module(s) 305 determine that no online storage account records in the online storage account table 360 of the database 230 contain the user ID 315 for the currently logged in user account, the user account module(s) 305 may be configured to render an advertisement such as that seen in FIG. 4, advertising the service to associate the one or more registered domain names with a file folder 365 stored within the online storage module(s) 355 and further advertising the ability to create an online storage account to create the online file folder 365 to associate with the domain name. The user account module(s) 305 may then transmit the advertisement to the user via the user's client computer 220.

If the user account module(s) 305 determine that no domain name records in the domain name table 325 of the database 230 contain the user ID 315 for the currently logged in user account, the user account module(s) 305 may be configured to render an advertisement such as that seen in FIG. 5, advertising a service to associate the one or more registered domain names with a file folder 365 stored within the online storage module(s) 355, and further advertising the ability to register a domain name to associate with the file folder 365. The user account module(s) 305 may then transmit the advertisement to the user via the user's client computer 220.

If the user account module(s) 305 determine that one or more online storage account records in the online storage account table 360 of the database 230, and one or more domain name records in the domain name table 325 of the database 235 contain the user ID 315 for the currently logged in user account, the user account module(s) 305 may be configured to render an advertisement such as that seen in FIG. 6, advertising the service to associate one or more registered domain names with an existing file folder 365 stored within the online storage module(s) 355. The user account module(s) 305 may then transmit the advertisement to the user via the user's client computer 220.

These "pop in" advertisements may be configured to receive information from the user indicating that the user has made their decision regarding this opportunity and no longer wants to receive the advertisement. The user account module(s) 305 may be configured to receive and store this information, possibly flagging the record comprising the user ID 315 in the user account table 310 of the database as declining the advertisement. The next time the user logs into their user account, or any software using this user ID 315, the flag in the database record may be used to determine not to show the associated user the advertisement for the service.

If the user does not already have an online storage account, an interface such as that shown in FIG. 4, may be used to access a server-rendered online storage account setup interface. If an SSO paradigm as described above (where the user account acts as a "master account" for all software) is not used, this online storage account user interface may be configured to gather user validation information such as username/password and/or contact information from the user and transmit this information to be stored within the database 230 in association with the user account via the user ID 315. Otherwise, the online storage module 355 may be accessible via the SSO authentication from the user account module(s) 305.

For each online storage account set up, the online storage module(s) 355 may be configured to identify the associated user ID 315, and generate and insert a new record into the online storage account table 360 of the database. This record may comprise the user ID 315 and, as non-limiting examples, the date the account was created.

As seen in the non-limiting example embodiment shown in FIG. 7, the online storage module(s) 355 may be a part of a "workspace" personal organization software suite further including an email component, a calendar/scheduling component and a fax component. In some embodiments, such as that shown in FIG. 7, these components, including the online storage module(s) 355 may be part of a hosted website comprising a series of web pages rendered by the server(s) 210 and transmitted to the user's client computer 220 for display.

FIG. 7 also shows that the online storage module(s) 355 may be configured to receive a request from the user to create one or more file folders 365 linked to the online storage module(s) 355. The user may also select a name for the file folder(s) 365. The online storage module(s) 355 may be configured to receive the request and the name for the file folder(s) 365 and may generate the file folder(s) 365 within the online storage module(s) 355 environment. Using the navigation within the online storage control panel 370 for the online storage module(s) 355, the user may then select various created file folders 365 (e.g., "Big Presentations," "Documents," "Images," "Videos" seen in FIG. 7) and upload electronic files to, or download electronic files from these file folders 365.

FIG. 7 also shows that files within the file folders 365 may be shared publicly (e.g., "My Public Links," "Shared Folders") To accomplish this, the online storage module(s) 355 may be configured to generate a "generic" link for each file folder 365 (e.g., http://files.secureserver.net/XYZ12345), and associate this generic link with the created file folder 365, possibly within the relevant DNS files 335 for that URL or via a redirect to the file folder 365 via the generic link. As each of these file folders 365 is created, the online storage module(s) 355 may assign an IP address to access the file folder 365 and/or create redirects to the IP address of the file folder 365.

Once the generic link/URL has been associated with the created file folder 365, the online storage module(s) 355 may be configured to receive one or more requests from the user to share the created file folder 365, and the user may include the generated generic link via email, SMS, etc. for others to access the created file folder 365, thereby sharing the file folder 365 with other users.

The functionality of the online storage module(s) 355 may be accessible to the user via various control panel links and tabs within the interface, such as the "Files," "Settings," "Tools," and "Sharing" links and tabs displayed in FIG. 7. In some embodiments, such as that shown in FIG. 7, the online storage module(s) 355 may be configured to render a link or button to set up the service to associate the one or more registered domain names with a file folder 365 linked to the online storage module(s) 355.

On receiving a request to set up this service, the online storage module(s) 355 may be configured to determine the user ID 315 associated with the online storage account from which the request was received. The online storage module(s) 355 may be configured to identify the user ID 315 within the online storage account record used to access the online storage account.

Figure 8:
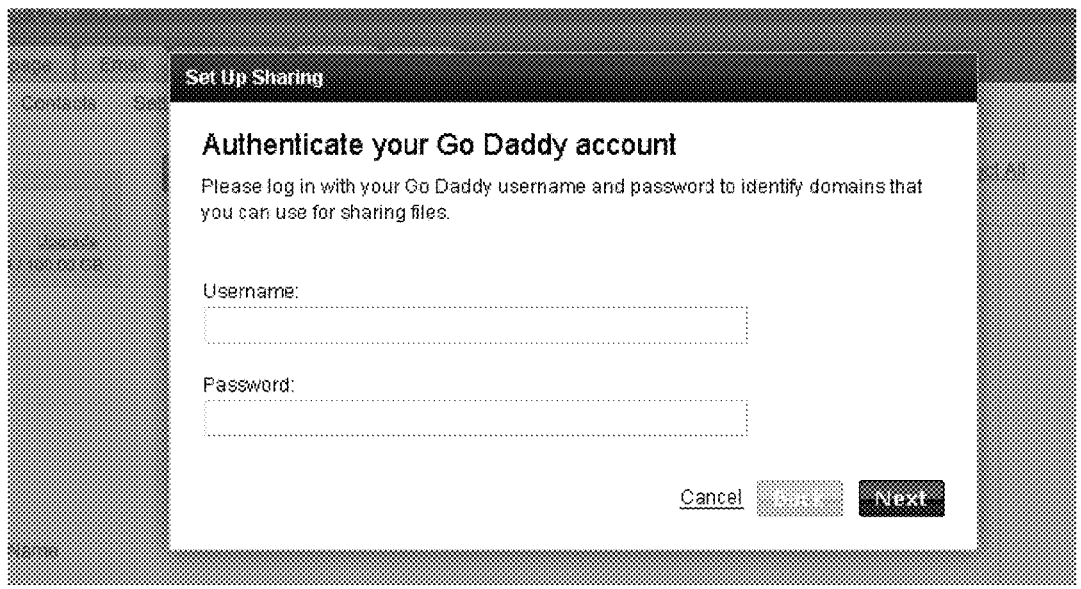
FIG. 8 is an example interface illustrating a possible embodiment of a system and method of associating an online file folder with a URL.

In embodiments which don't use the SSO paradigm described herein (where the user account acts as a "master account" for all software) a login, possibly an SSO login, may be required to access the domain name records in the domain name table 325 of the database 230. To accomplish this, an SSO login, such as that shown in FIGS. 8 and 9 may be rendered and displayed by the online storage module(s) 355, possibly as a "pop in" window, within the online storage control panel. The online storage module(s) 355 may then receive the entered information and verify the user, possibly under an SSO paradigm.

The online storage module(s) may then be configured to determine, possibly via a database 230 query, whether any domain name records in the domain name table 325 comprise the identified user ID 315. If the returned result for the database query contains no records, the online storage module(s) 355 may be configured to determine that no domain names are associated with the user ID 315 used to log into the account for the online storage module(s) 355.

Figure 10:
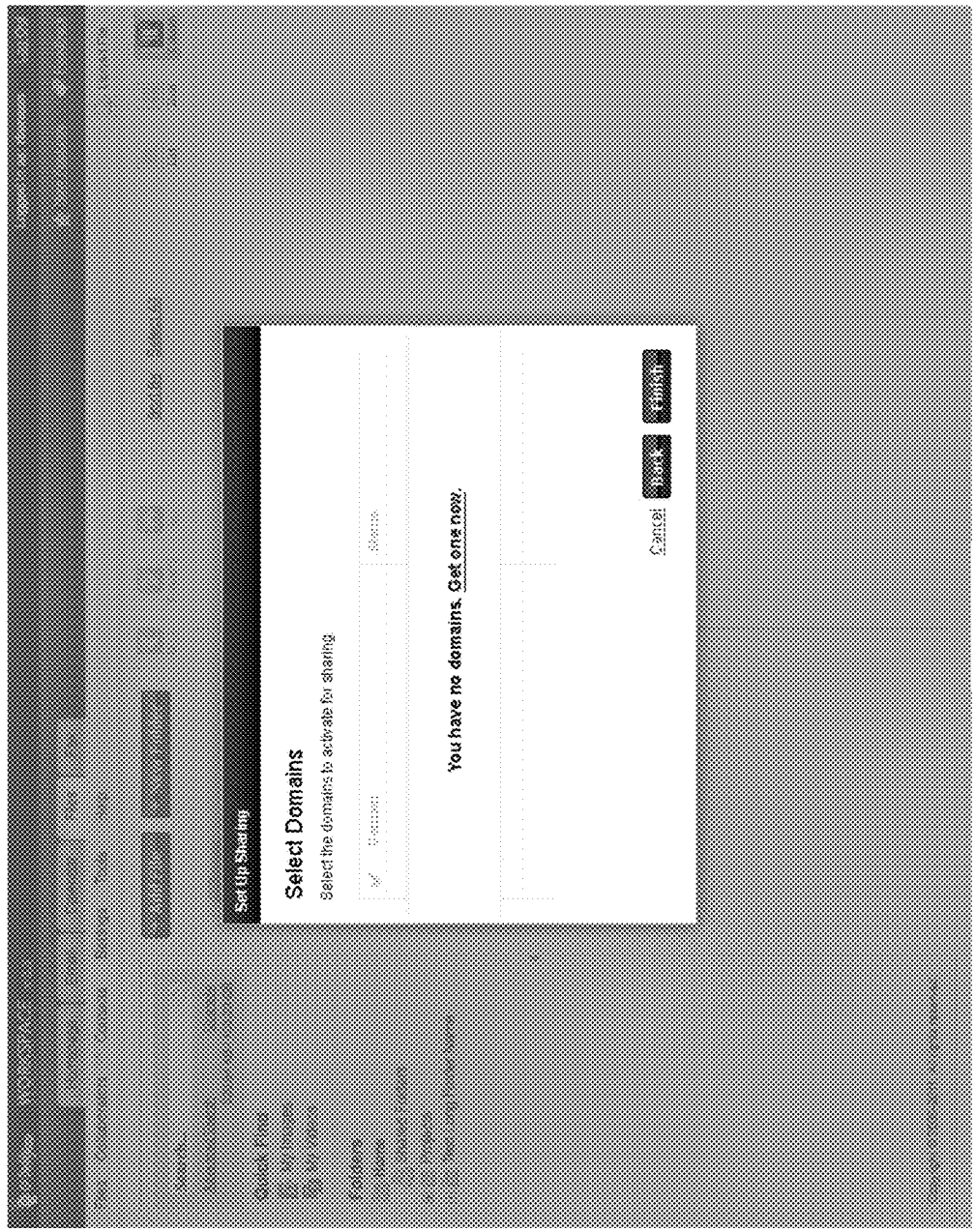
FIG. 10 is an example interface illustrating a possible embodiment of a system and method of associating an online file folder with a URL.

If the online storage module(s) 355 determine that no domain names are associated with this user ID, the online storage module(s) 355 may be configured to render a "pop in" web page window such as that seen in FIG. 10 and transmit it to the client(s) 220 for display. The online storage module(s) 355 may be further configured to receive the selection to register a domain name and resolve the selected link to the domain name module(s) 320 as described herein.

However, if one or more domain name records are found in the returned result for the database 230 query, the online storage module(s) 355 may be configured to identify the domain name within each record and generate a list comprising each of the identified domain names. Using this list, the online storage module(s) 355 may be configured to render a web page such as that seen in FIG. 11 comprising a list and/or table of each of the identified domain names. The rendered web page may also include an interface element (such as the checkboxes displayed in FIG. 11) and a status for each of the listed domain names (such as "Available," "Missing Name," Registered by another user, etc., as shown). The online storage module(s) 355 may then be configured to transmit the rendered web page to the client(s) 220.

The user may select, using the rendered interface element, one or more domain names from the web page and request each domain name be shared and associated with a file folder 365 accessible via a "vanity domain" for that folder. The online storage module(s) 355 may be configured to receive the one or more selections and their associated domain names.

Figure 9:
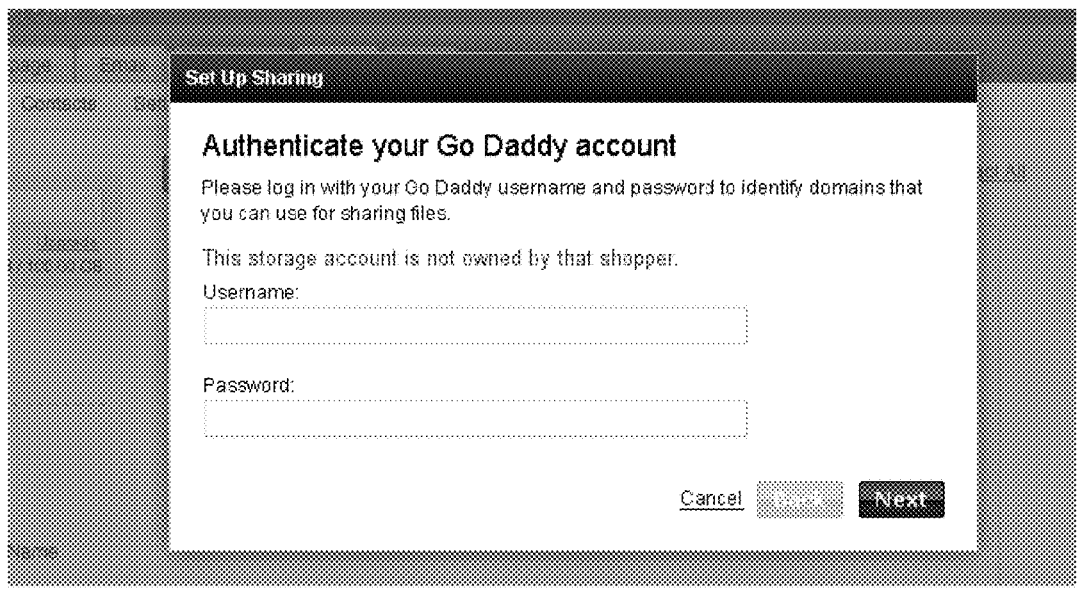
FIG. 9 is an example interface illustrating a possible embodiment of a system and method of associating an online file folder with a URL.
Figure 11:
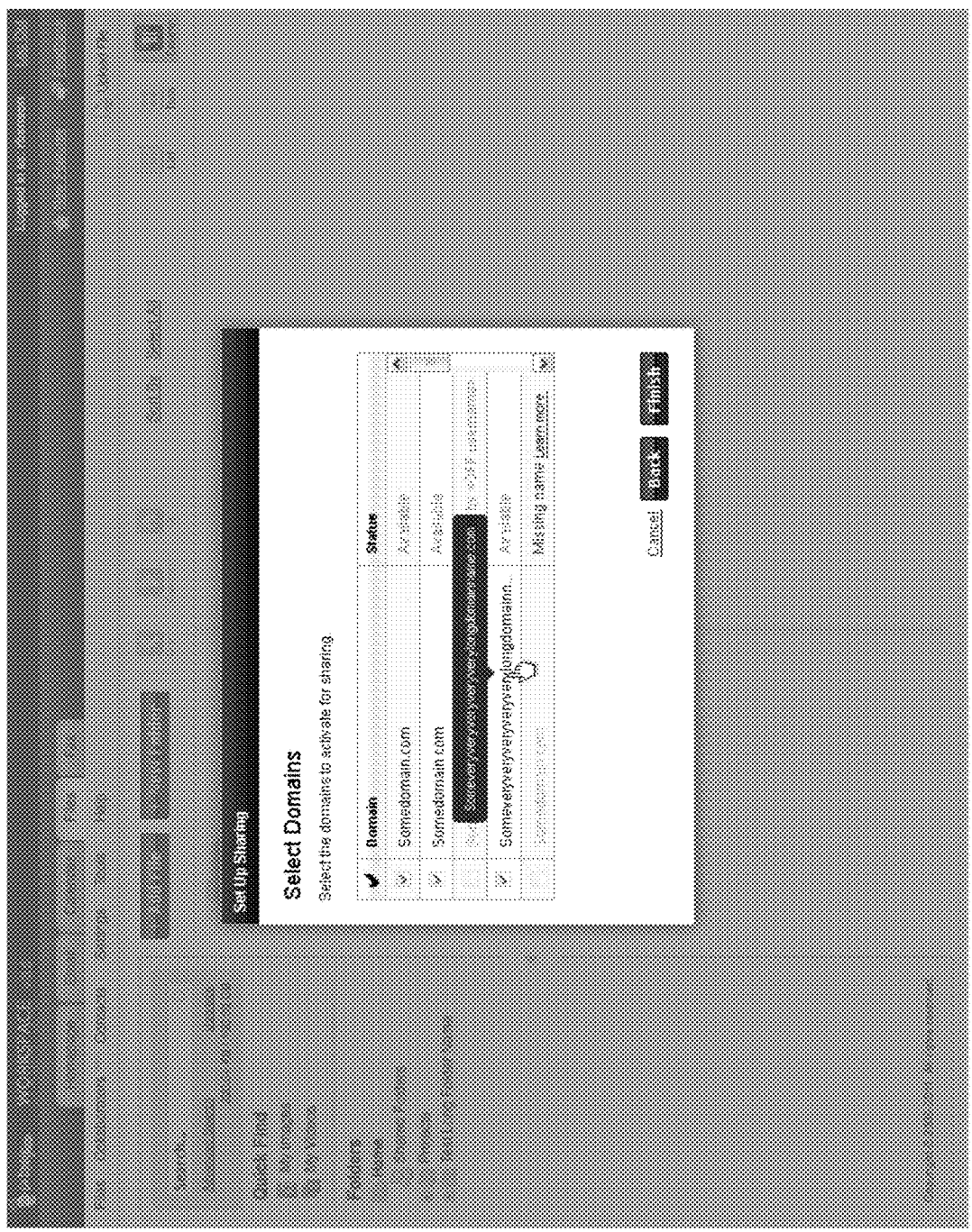
FIG. 11 is an example interface illustrating a possible embodiment of a system and method of associating an online file folder with a URL.

As seen in FIGS. 9 and 11, in some embodiments, the online storage module(s) 355 may access (possibly via sources other than the database 230) and render domain names that are not registered to the user, are registered to another user, are registered to the user through another account and/or where no information about the domain name is available. Although rendered and displayed, these domain names may be disabled from being selected to be associated with the generated file folder 365, because these domain names are not associated with the online storage module(s) 355.

Using the received domain names selected from the web page, the online storage module(s) 355 may be configured, for each of the selected domain names, to access the appropriate DNS record within the DNS file 335 for that domain name. In some embodiments, this access may be accomplished by the online storage module(s) 355 sending an RPC or other web service request (e.g., "getRRecords") to the API 300, which may then access the DNS record for the selected domain name within the appropriate DNS file(s) 335 on the appropriate DNS server 340.

In some embodiments, the DNS record for the selected domain name may be identified by searching the DNS file(s) 335 for the domain name. In embodiments where the DNS information is stored in a DNS database 350, database records with the appropriate search parameters may be searched to determine the database records relevant to the selected domain names. In some embodiments, the search in either DNS record(s) or database embodiments may include the parameters 'domain' (comprising the domain name) and 'type' 'ARecord' (comprising the zone file type A record) or 'files,' thereby limiting the search results for more efficient searching.

Having accessed the DNS file(s) 335, the record(s) may be searched for the CNAME 345 to identify, within the DNS records, the sub domain inserted into the DNS record as an alias. The CNAME 345 may be validated (e.g., verifying if there a valid "files." CNAME 345 in embodiments that automatically generate "files." as a subdomain). In some embodiments, if no valid CNAME 345 is found, the online storage module(s) 355 may be configured to render, and transmit to the client(s) 220 for display, an alert for the identified domain name (possibly using an icon) which instructs the user on how to create a valid CNAME 345 for the domain name. Once a valid CNAME is identified, the sub domain/alias/CNAME 345 may be returned to the online storage module 355.

Figure 12:
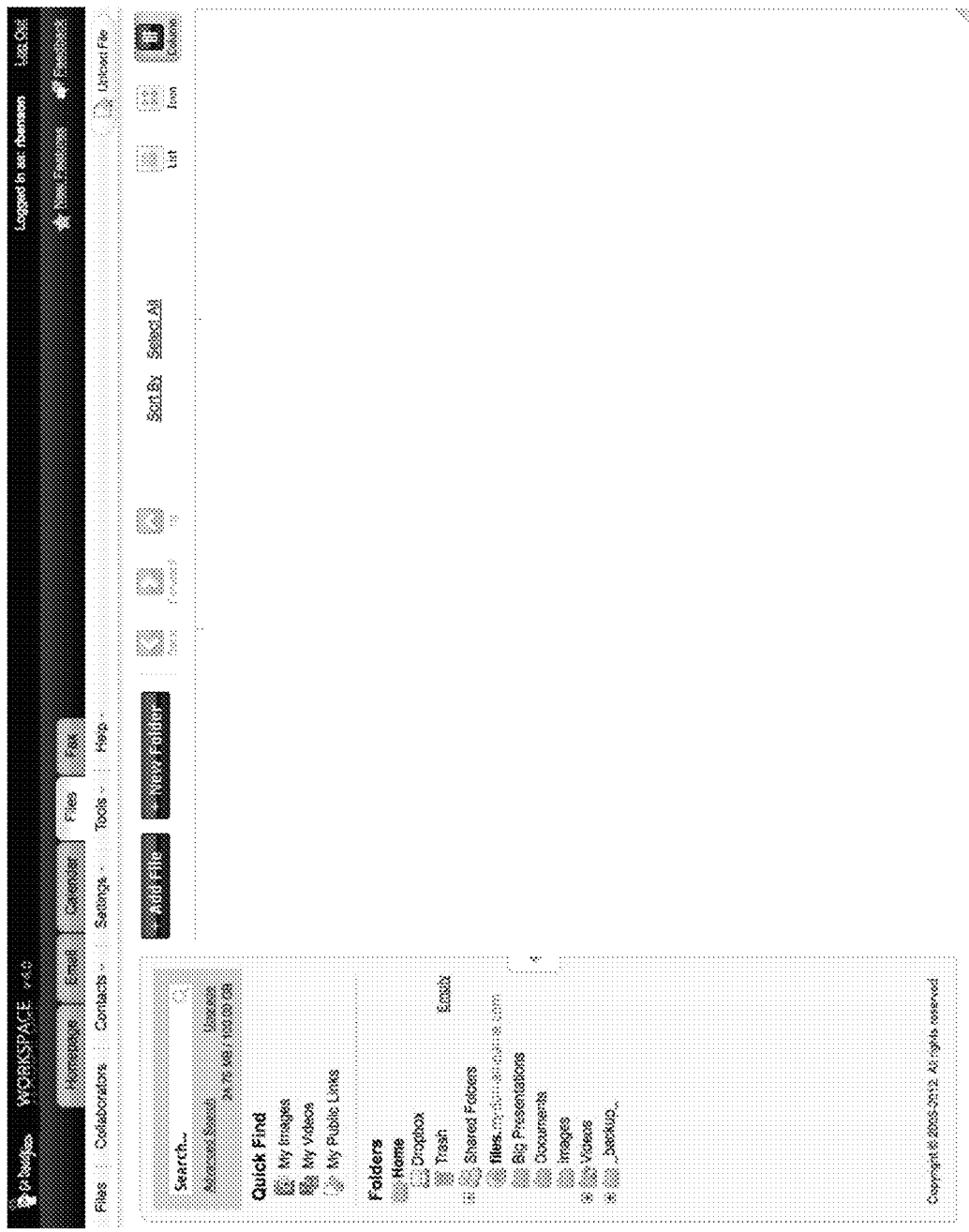
FIG. 12 is an example interface illustrating a possible embodiment of a system and method of associating an online file folder with a URL.
Figure 13:
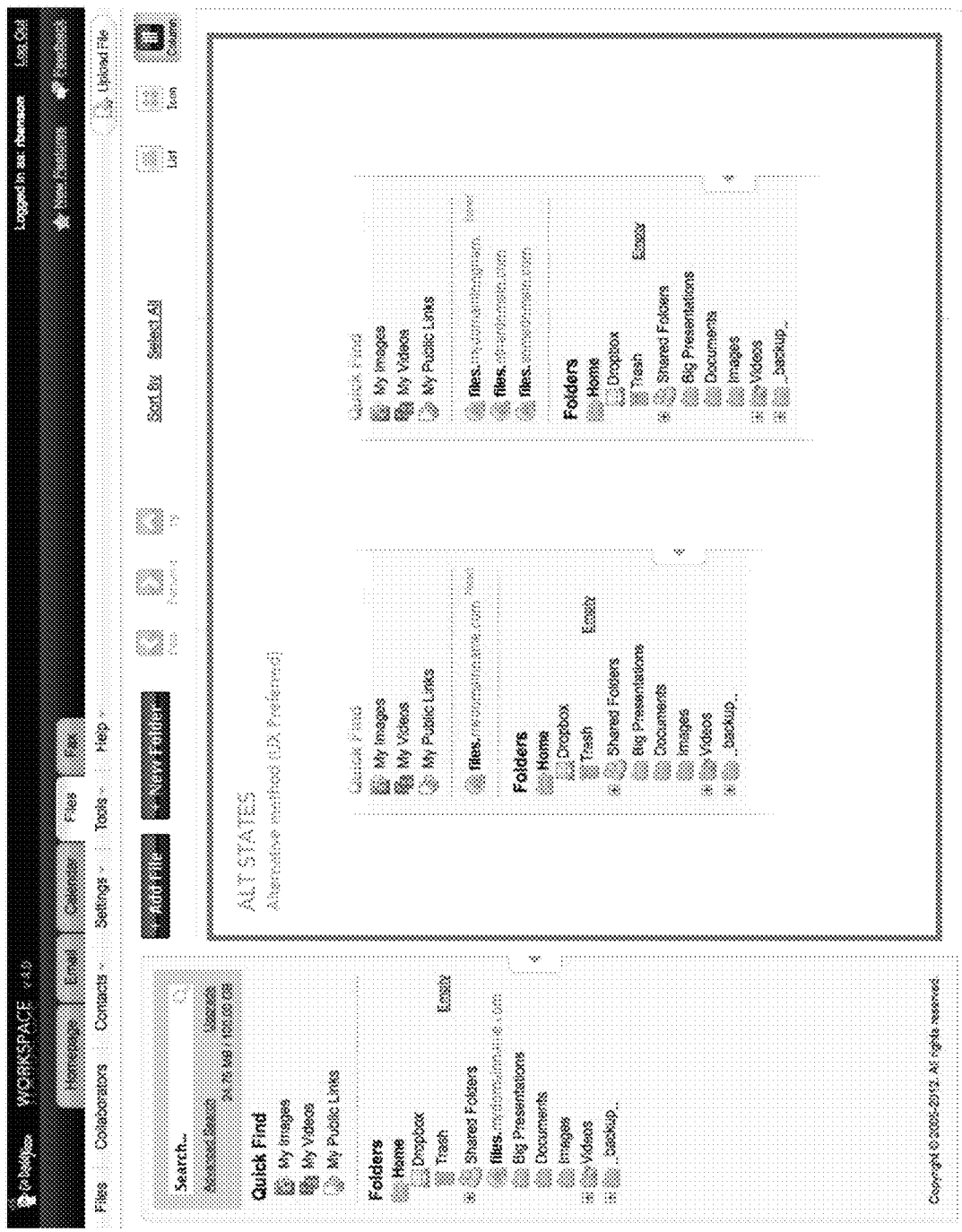
FIG. 13 is an example interface illustrating a possible embodiment of a system and method of associating an online file folder with a URL.

For each selected domain name with a valid CNAME 345 in the related DNS records, the online storage modules(s) 355 may be configured to create a file folder 365. In some embodiments, as seen in FIG. 12, the online storage module(s) 355 may be configured to generate the file folder 365 at the "root" level and may automatically name the domain name the sub domain, as received from the sub domain/alias/CNAME 345, concatenated to the selected domain name (e.g., "files.mydomainname.com" as seen in FIG. 12). In some embodiments, the online storage module(s) 355 may be configured to determine whether another file folder 365 comprising the same name already exists within the online storage module(s) 355. If so, the online storage module(s) 355 may be configured to render and transmit to the client(s) 220, for display, an alert that the existing file name must be changed in order to continue with the domain name association. As seen in FIG. 13, a plurality of domain names may be associated with file folders 365 created for the domain name in the same account.

The server(s) 210 may be configured to receive one or more HTTP requests comprising the subdomain/alias/CNAME 345 concatenated to a domain name. The server(s) 210 may then be configured to resolve the HTTP request to the file folder created and named according to the subdomain/alias/CNAME 345 concatenated to domain name.

The request may be routed to the file folder 365 in various ways. In some embodiments, the DNS records may be updated to reflect the sub domain/alias/CNAME 345 as being routed to the IP address generated and established for the created file folder 365. The online storage module(s) 355 may then be configured to allow the "files." or other sub domain to point to the IP address of the domain name created for the newly-generated file folder 365. In other embodiments, the online storage module(s) 355 may comprise web pages or other software scripts configured to redirect any requests to the generated URL/IP address for the newly generated file folder 365.

Figure 14:
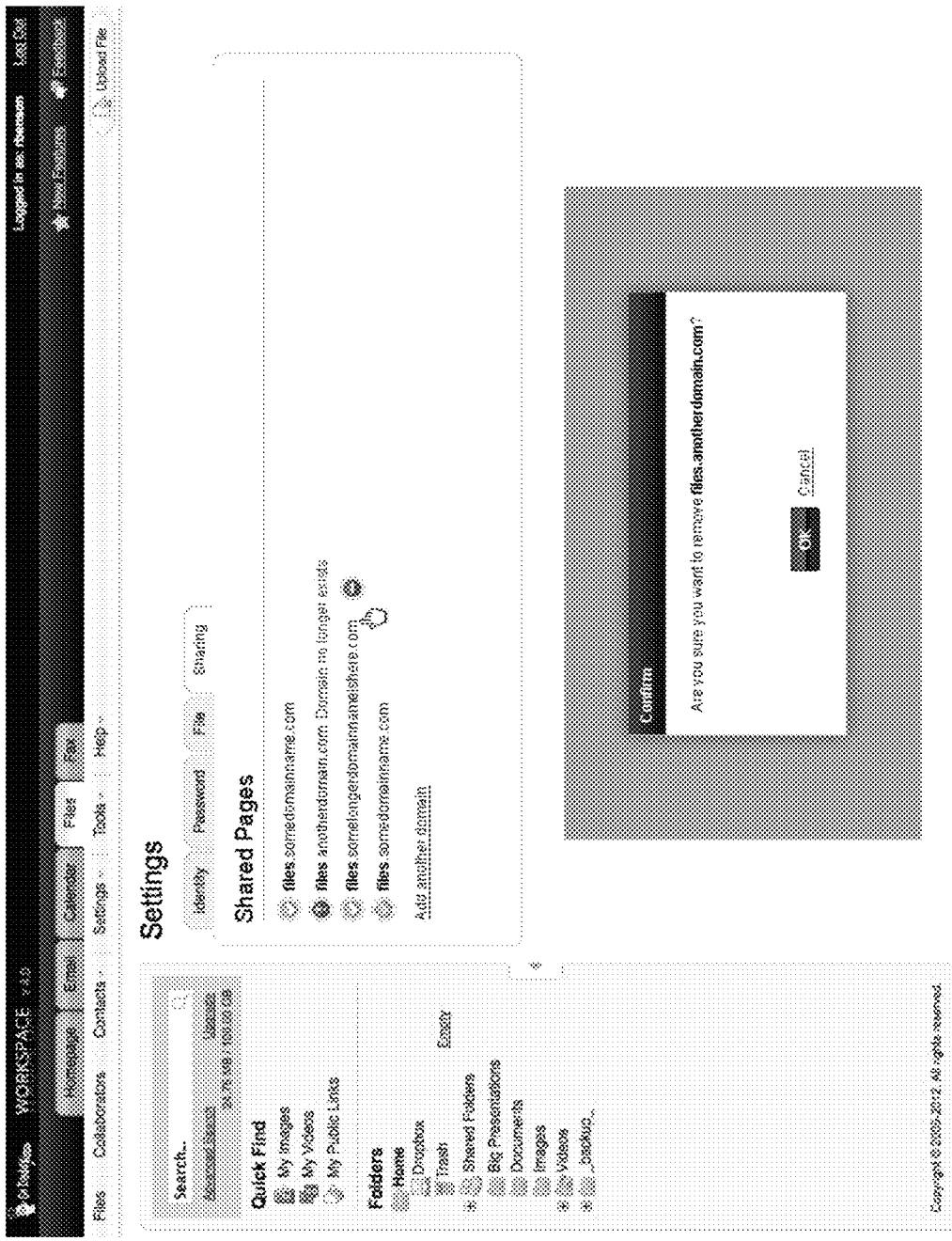
FIG. 14 is an example interface illustrating a possible embodiment of a system and method of associating an online file folder with a URL.

In the non-limiting example embodiment shown in FIG. 14, the association between the domain name and the generated file folder 365 for the domain name may be tracked using the online storage module(s) 355 (possibly via the "files." sub domain). In these embodiments, the online storage module(s) 355 may be configured so that it is impossible to delete the file folder 365 while the association between the file folder 365 and the domain name continues. As seen in FIG. 14, if a domain name were no longer in the control of the user account, the online storage module(s) 355 may be configured to "disassociate" the file folder 365 from the domain name. The online storage module(s) 355 may be configured to render and transmit to the client(s) 220 for display, the web page shown in FIG. 14. The user may select a file folder 365 to disassociate, and the online storage module(s) 355 may be configured to receive the selection and disassociate the file from the domain name.

Any steps included in the embodiments illustrated in FIGS. 1-14 are not limited to their respective illustrated embodiments, and may be combined in several different orders and modified within multiple other disclosed embodiments. Likewise, the method steps disclosed herein may be accomplished by a software module executed on a server and/or client configured to accomplish that method step.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system, comprising a server computer, communicatively coupled to a network and comprising a processor executing instructions to run:
   a domain name software module configured to register a domain name to a user;
   an online storage software module configured to:
      generate a file folder configured to store at least one file;
      render an online storage control panel, available to the user after authentication, comprising:
         a folder name interface control configured to receive, from the user, a folder name for the file folder; and
         a file management interface control configured to upload or download the at least one file to or from the file folder; and
      map, within a zone file for the domain name, the file folder to a uniform resource locator comprising the folder name concatenated as a sub domain to the domain name.

2. The system of claim 1, further comprising a user account software module running on the server computer and comprising instructions executed by the processor to:
   receive, from the user, a request to create a user account;
   generate and store, in a database communicatively coupled to the network, a user account record comprising a user account identifier;
   identify, in the database, a domain name record comprising the user account identifier;
   identify, in the database, an online storage account record comprising the user account identifier.

3. The system of claim 1, wherein the domain name software module is further configured to:
   identify, within a user account record stored in a database communicatively coupled to the network, a user account identifier for the user;

receive a request to register the domain name;
register the domain name to the user;
generate and store, in the database, a domain name record comprising:
the user account identifier; and
the domain name; and
generate and insert:
the zone file for the domain name into a domain name system; and
an alias, comprising the folder name as the sub domain, into a resource record within the zone file.

4. The system of claim 3, wherein the domain name software module is further configured, prior to generating and inserting the alias into the resource record, to receive, from the user, the folder name as the sub domain.

5. The system of claim 1, further comprising a user account software module comprising instructions executed by the processor to:
identify, within a user account record stored in a database communicatively coupled to the network, a user account identifier for the user;
determine whether the user account identifier is flagged in the database as declining an advertisement to associate the domain name with the file folder; and
responsive to a determination that the user account identifier is not flagged as declining the advertisement:
determine whether a domain name record in the database comprises the user account identifier;
determine whether an online storage account record in the database comprises the user account identifier;
render the advertisement, wherein:
responsive to a determination that the domain name record does not comprise the user account identifier, the advertisement comprises means to register a domain name; and
responsive to a determination that the online storage account record does not comprise the user account identifier, the advertisement comprises means to create the online storage account; and
transmit the advertisement to a client computer communicatively coupled to the network.

6. The system of claim 1, wherein the online storage software module is further configured to:
identify, within a user account record stored in a database communicatively coupled to the network, a user account identifier for the user;
receive, from the user, a request to create an online storage account;
generate and store, in the database, an online storage account record comprising the user account identifier; and
create the file folder within the online storage software module.

7. The system of claim 6, wherein the online storage software module is further configured to:
determine whether at least one domain name record in the database comprises the user account identifier;
responsive to a determination that the at least one domain name record comprises the user account identifier:
identify, within each of the at least one domain name record, the domain name;
render and transmit, to a client computer communicatively coupled to the network, a first web page comprising:
a list comprising the domain name identified within each of the at least one domain name record; and
a user interface element configured for the user to select the domain name; and
responsive to a determination that the at least one domain name record does not comprise the user account identifier:
render and transmit, to the client computer, a second web page comprising a user interface element for requesting to register the domain name;
receive a request to register the domain name; and
redirect to a domain name account control panel configured to register the domain name.

8. The system of claim 7, wherein the online storage software module is further configured to:
receive, from the user via the first web page, a selection of at least one domain name in the list;
identify, within the zone file for the domain name, an alias for the uniform resource locator;
generate, within the online storage software module, the file folder at a root level wherein the name for the file folder comprises the sub domain concatenated to the domain name.

9. The system of claim 8, wherein the online storage software module is further configured to:
identify an internet protocol address of the file folder; and
update the alias to point to the file folder.

10. A system, comprising:
at least one network storage device communicatively coupled to a network and comprising a processor configured to store at least one file in a file folder;
a domain name system server comprising a processor and communicatively coupled to the network and further comprising a zone file for a domain name mapping a uniform resource locator, comprising a folder name concatenated as a sub domain to the domain name, to the file folder; and
a server computer comprising a processor executing instructions to run:
a domain name software module configured to register the domain name to a user; and
an online storage software module configured to:
generate the file folder;
render an online storage control panel, available to the user after authentication, comprising:
a folder name interface control configured to receive, from the user, a folder name for the file folder; and
a file management interface control configured to upload or download the at least one file to or from the file folder; and
update the zone file to map the uniform resource locator to the file folder.

11. The system of claim 10, further comprising a user account software module running on the server computer and comprising instructions executed by the processor to:
receive, from the user, a request to create a user account;
generate and store, in a database communicatively coupled to the network, a user account record comprising a user account identifier;
identify, in the database, a domain name record comprising the user account identifier;
identify, in the database, an online storage account record comprising the user account identifier.

12. The system of claim 10, wherein the domain name software module is further configured to:
identify, within a user account record stored in a database communicatively coupled to the network, a user account identifier for the user;

receive a request to register the domain name;
register the domain name to the user;
generate and store, in the database, a domain name record comprising:
   the user account identifier; and
   the domain name; and
generate and insert:
   the zone file for the domain name into a domain name system; and
   an alias, comprising the folder name as the sub domain, into a resource record within the zone file.

13. The system of claim 12, wherein the domain name software module is further configured, prior to generating and inserting the alias into the resource record, to receive, from the user, the folder name as the sub domain.

14. The system of claim 10, further comprising a user account software module comprising instructions executed by the processor to:
identify, within a user account record stored in a database communicatively coupled to the network, a user account identifier for the user;
determine whether the user account identifier is flagged in the database as declining an advertisement to associate the domain name with the file folder; and
responsive to a determination that the user account identifier is not flagged as declining the advertisement:
   determine whether a domain name record in the database comprises the user account identifier;
   determine whether an online storage account record in the database comprises the user account identifier;
   render the advertisement, wherein:
     responsive to a determination that the domain name record does not comprise the user account identifier, the advertisement comprises means to register a domain name; and
     responsive to a determination that the online storage account record does not comprise the user account identifier, the advertisement comprises means to create the online storage account; and
   transmit the advertisement to a client computer communicatively coupled to the network.

15. The system of claim 10, wherein the online storage software module is further configured to:
identify, within a user account record stored in a database communicatively coupled to the network, a user account identifier for the user;
receive, from the user, a request to create an online storage account;
generate and store, in the database, an online storage account record comprising the user account identifier; and
create the file folder within the online storage software module.

16. The system of claim 15, wherein the online storage software module is further configured to:
determine whether at least one domain name record in the database comprises the user account identifier;
responsive to a determination that the at least one domain name record comprises the user account identifier:
   identify, within each of the at least one domain name record, the domain name;
   render and transmit, to a client computer communicatively coupled to the network, a first web page comprising:
     a list comprising the domain name identified within each of the at least one domain name record; and
     a user interface element configured for the user to select the domain name; and
responsive to a determination that the at least one domain name record does not comprise the user account identifier:
   render and transmit, to the client computer, a second web page comprising a user interface element for requesting to register the domain name;
   receive a request to register the domain name; and
   redirect to a domain name account control panel configured to register the domain name.

17. The system of claim 16, wherein the online storage software module is further configured to:
receive, from the user via the first web page, a selection of at least one domain name in the list;
identify, within the zone file for the domain name, an alias for the uniform resource locator;
generate, within the online storage software module, the file folder at a root level wherein the name for the file folder comprises the sub domain concatenated to the domain name.

18. The system of claim 17, wherein the online storage software module is further configured to:
identify an internet protocol address of the file folder; and
update the alias to point to the file folder.

* * * * *